July 12, 1960
M. MOSNÝ ET AL
2,945,116
METHOD FOR CONTROLLING THE TRAVEL OF
WELDING MACHINE USED FOR ELECTRICAL
ARC WELDING INTO MOLTEN SLAG
Filed May 14, 1958
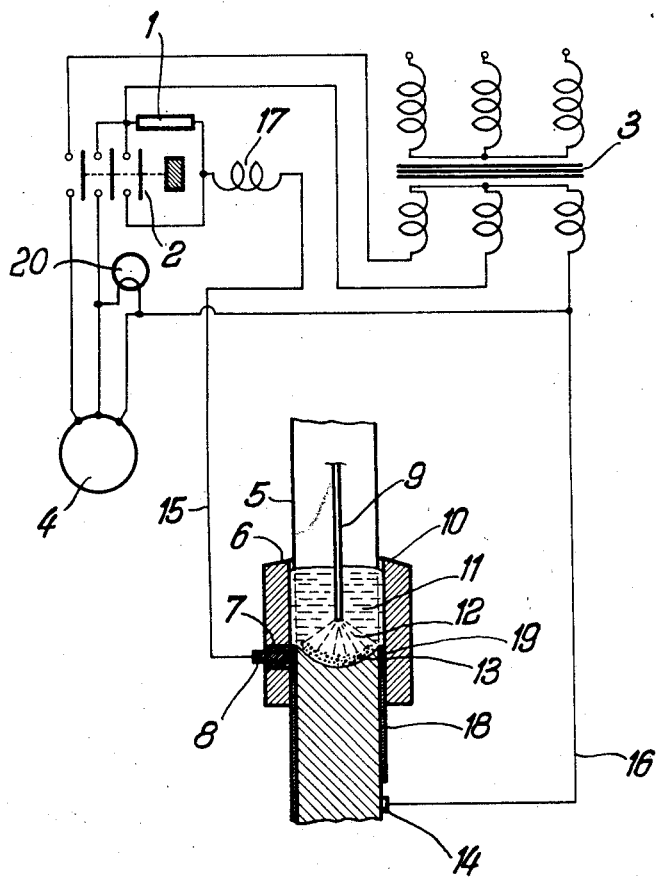
Inventors
Martin Mosný, Viliam Pavelka

United States Patent Office 2,945,116
Patented July 12, 1960

2,945,116

METHOD FOR CONTROLLING THE TRAVEL OF WELDING MACHINE USED FOR ELECTRICAL ARC WELDING INTO MOLTEN SLAG

Martin Mosný, 14 Zahradnicka, and Viliam Pavelka, 9 Jeruzalemska, both of Bratislava, Czechoslovakia Filed May 14, 1958, Ser. No. 735,326

Claims priority, application Czechoslovakia June 17, 1957

5 Claims. (Cl. 219—73)

This invention relates generally to a method and device for controlling the travel of a welding machine used for electrical arc welding in a bath of molten slag. The method consists in the use of an auxiliary electrical circuit for controlling the travel of the welding machine, with the electrical properties of such circuit depending on the consistency of the layer of slag which is interposed in the circuit, and which, in the course of welding, is deposited on both sides of the weld seam and whose conductivity varies as the slag changes from the liquid state to the plastic state and finally to the solid state.

Automatic electrical welding in a bath of molten slag on vertical or inclined surfaces is usually carried out in such a way, that the welding wire, fed to the weld by the welding machine, is immersed in molten slag. The molten slag protects the molten weld metal from the influence of the atmosphere and a special device, commonly cooled by flowing water, prevents the molten weld metal and the slag from flowing away from the weld area. The welding machine, which feeds the welding wire, and also the cooling device must travel upwards, thus following the rising level of the molten welding metal.

The level of molten welding metal is covered by molten slag, and is hidden by the cooling device at both sides, which renders impossible the reliable control of the level of weld metal by normal means, i.e. by visual checking. Moreover, the molten weld metal is surrounded by a zone of very high temperature, which is higher than the melting point of almost all materials commonly used for temperature measurement.

On the other hand, the side-plates of the cooling device must, in the course of welding, be kept in a definite position relative to the level of molten weld metal. If these side-plates are placed too low with regard to the level of weld metal, the molten slag flows away, so that its level is lowered excessively, and this invariably leads to faults in the welded seam. On the contrary, if the cooling side-plates are located too high, the welded joint may have defects caused by an excessive length of bare electrode protruding from the current carrying contact grip, and, in addition, the molten flux as well as the molten metal may escape beneath the lower edges of the cooling side-plates, which again makes welding impossible.

Known machines for automatic arc welding in a bath of molten slag must, in any case, be operated by a trained worker, who incessantly checks the welding head and controls—according to the color of the metal surrounding the welding spot—the travel of the welding electrode as well as that of the cooling device in such a way that the welding process is not unfavourably affected by incorrect positioning of the cooling side-plates with regard to the level of molten weld metal.

Control devices, based upon the use of thermocouples, have been proposed for automatically controlling the movement of the welding electrode and cooling side plates. Devices of this kind did not perform very well, when actually used in welding practice, since they are not fully responsive to the various conditions of welding and, moreover, they require complex amplifying equipment for transferring the measured values to the feeding mechanism of the welding machine.

It has also been proposed to control the travel of the welding machine relative to the rising level of the welding bath by means of a probe, connected to an auxiliary electrical circuit regulating the control device which requires a current of 20 . . . 30 amperes. The bare end of the probe is placed at a certain distance from the level of molten weld metal in such a way that a sort of subsidiary arc or anionized zone is maintained between the tip of the probe and the molten weld metal. In the course of welding the level of molten weld metal is raised and the distance from the latter to the tip of the probe is decreased.

Consequently the electrical resistance of the ionized zone varies and introduces a changing potential difference into the auxiliary circuit. The changing potential difference is employed for the operation of a mechanism controlling the travel of the welding machine. Practical results, which were attained with the above described equipment, were far from satisfactory. The probe makes access to the welding wire or electrode as well as its handling rather difficult. Moreover, in the course of welding, frozen slag is deposited on the probe at such a considerable rate that continuous welding without undue disturbances may be impossible.

In another modification of the above described control method, the probe is located inside the cooling device of the welding machine and the bare end of the probe protrudes into the layer of molten slag within the groove or gap between the pieces to be welded together. The bare end of the probe is positioned at a predetermined distance above the level of molten weld metal. This control method also failed in practice, since the wear of the probe, due to heavy electrical currents transported thereby, is excessively high. Consequently the probe must be frequently checked and replaced. Further, this control method requires a highly complicated mechanism for governing the travel of the welding machine, whereby the bulk and weight of the entire welding equipment are unduly increased.

The object of the present invention is to provide a simple and reliable method and apparatus for controlling the travel of a welding machine relative to the rising level of the welding bath, and which is to be used for electrical arc welding into molten slag. The invention eliminates the disadvantages inherent in the existing devices intended for the same purpose.

The invention consists basically in that the opening or closing of the auxiliary electrical circuit, from which the control of the upward travel of the welding machine alongside the welded seam is derived, depends on the changing physical properties of a thin layer of slag which is deposited on both sides of the welded seam. The existence of this lateral slag layer is inherent in the method of arc welding in a bath of molten slag, since the molten slag always penetrates into the space between the inner surface of each cooling side-plate of the welding machine and the weld metal, which produces the welded seam. In the course of welding this thin layer of slag gradually changes from the liquid state to the plastic state and finally to the solid state. Nearly all fluxes, when solidifying as described above, exhibit a pronounced change in electrical conductivity. Generally, the electrical conductivity is considerably reduced when the flux changes from the liquid to the paste-like state and is reduced practically to zero when the flux freezes to the solid state. In case the above mentioned lateral layer of slag is introduced into an auxiliary electrical circuit, this circuit may either be closed or interrupted by the changes in electrical conductivity of the slag layer. The main advantage of this sort of control consists in that the current flowing in the auxiliary circuit may easily be reduced to as low as one ampere. The auxiliary electrical circuit controls the mechanism governing the travel of the welding machine, so that, when the auxiliary circuit is closed or interrupted, an impulse is generated in that circuit, for causing the travel of the welding machine to be stopped or started. The auxiliary circuit may also initiate the operation of a suitable signalling or other control device.

The device for controlling the travel of a welding machine in accordance with the present invention, may be best understood from the accompanying drawing which shows a combined schematic and wiring diagram thereof.

Referring to the drawing in detail, it will be seen that the lower end of welding wire 9 is, in the course of welding, immersed in molten slag 11. Due to the passage of welding current, which flows from the end of welding wire or electrode 9 to the level of molten weld metal 13, a highly ionized zone is produced. The liquid welding metal 13 gradually cools and freezes. Both the molten weld metal and the liquid slag 11 must be prevented from flowing out of the groove or gap between the edges of the work pieces or plates 5 which are being welded together. Thus, two side-plates 6 and 10 which are cooled by water or other cooling medium span the gaps between the plates 5 at the opposite sides of the latter in the region where welding is taking place. One of these side-plates carries the probe 8, which is electrically insulated from the plate by a bushing 7 of suitable insulating material, for example, mica.

The probe 8 is connected to a conductor 15 forming part of an auxiliary electrical circuit, and another conductor 16 of that circuit is attached to the solidified weld metal, as at 14. The circuit is completed between probe 8 and connection 14 through the molten slag 11 and the molten weld metal 13. The conductor 15 is connected to the coil 17 of a relay which is, in turn, connected through a resistor to ground, while the conductor 16 is connected to a source 3 of electrical energy, for example, the secondary winding of a transformer. The coil 17 controls the contacts 2 of the relay. These contacts are open when the coil 17 is energized, that is, when the auxiliary circuit is closed. The contacts 2 are interposed in the energizing circuit of the electric motor 4, controlling the upward travel of the welding machine and of a signal lamp 20. As soon as the auxiliary circuit opens by reason of a break in the circuit between probe 8 and connection 14, the contacts 2 connect the motor 4 to the source 3 and the welding machine starts to move upwards. The lamp 20 lights up.

As welding proceeds, the level of molten weld metal slowly rises. When the motor 4 is de-energized, the position of the probe 8 remains unchanged. After the welding bath has risen to such a degree that the slag layer adjacent to the probe 8 becomes plastic, as indicated at 19, and afterwards even solid as indicated at 18, the auxiliary circuit opens, due to the considerable increase in the resistance of the slag layer in the vicinity of the probe 8. As soon as this happens, the current through the coil 17 is cut-off and the contacts 2 connect the motor 4 to the source 3. The motor 4 begins to operate, thus causing the welding machine and, therefore, also the probe 8, attached to the side-plate 6, to travel upward. The upward motion of the welding machine continues until the probe 8 arrives near to the spot of highest temperature, where it again is in contact with molten slag 11 having a relatively good electrical conductivity. The high temperature then acting on the probe 8 causes the plastic or solid deposit of slag, covering the tip of the probe 8, to melt, so that its resistance is suddenly lowered and the auxiliary circuit is again closed. This causes the coil 17 to be energized so that contacts 2 disconnect the motor 4 from the source 3, whereby the upward travel of the welding machine is interrupted.

Both the method and the device, to which this invention relates, make possible the reliable control of the arc welding process, in that the upward travel of the welding machine is maintained in correct relation to the rise of the welding bath level. The probe 8, which is the important element of the control, does not interfere with the welding wire or electrode in the course of welding. Moreover, the entire control equipment is simple and it requires only negligible current for energizing the auxiliary electrical circuit.

What we claim as new and desire to secure by Letters Patent of the United States, is:

1. In apparatus for electric welding in a bath of molten flux along edges of work pieces which extend at a substantial angle to the horizontal; the combination of a welding machine movable upwardly along the edges of the work pieces as the welding proceeds and including a welding electrode projecting downwardly into the gap between the edges of the work pieces and supplied with welding current to deposit molten weld metal in said gap under a bath of molten slag, cooling side plates spanning the gap between the edges of the work pieces at the opposite sides of the latter and adapted to contain the molten slag and weld metal in the gap, and an electric motor operative to move the welding machine upwardly along the edges of the work pieces, the distance between said side plates being slightly greater than the thickness of the work pieces so that layers of slag are deposited on the opposite sides of the weld metal; an auxiliary electric circuit connected to the solidified weld metal in the gap and to a conductive probe carried by one of said side plates and located with respect to the latter, in the direction of movement of the welding machine, so as to be disposed immediately below the top surface of the molten weld metal when said side plates are in their uppermost position in relation to the baths of molten slag and weld metal, said probe being in contact with the layer of slag deposited between the inner surface of the related side plate and the adjacent side of the weld metal so that the layer of slag contacting said probe and the weld metal are included in said auxiliary circuit to complete the latter when the layer of slag is molten, and therefore conductive, at the point of contact with said probe and to interrupt said auxiliary circuit when the layer of slag is in the solid state, and therefore non-conductive, at the point of contact with said probe; and control means for said electric motor actuated by said auxiliary circuit to operate said motor when the auxiliary circuit is interrupted by contact of the probe with slag in the solid state, thereby to move the welding machine upwardly until said probe is disposed immediately below the top surface of the molten weld metal where the high temperature melts the slag layer in contact with said probe for again completing said auxiliary circuit.

2. In apparatus for electric welding; the combination as in claim 1 wherein an end of said probe is flush with the inner surface of the cooling side plate carrying the probe.

3. In apparatus for electric welding; the combination as in claim 1 wherein said control means includes a relay having an operating coil interposed in said auxiliary circuit to be energized by the latter when the auxiliary circuit is completed and contacts maintained in open condition when said coil is energized and moved to closed condition upon de-energization of said coil, and an energizing circuit for said electric motor having said contacts of the relay interposed therein to drive said motor only when said contacts are in said closed condition.

4. In apparatus for electric welding; the combination as in claim 1 further comprising indicating means connected to said auxiliary circuit for actuation by the latter.

5. In a method of welding a gap between two metallic surfaces, the gap extending at a substantial angle to the horizontal, the steps of projecting a welding electrode downwardly into said gap for depositing molten weld metal in said gap from above so as gradually to fill the same with a body of metal the top of which gradually rises; continuously cooling said body of metal in said gap, whereby the temperature of said body decreases in a downward direction from a freshly deposited layer of metal at said top; maintaining a zone of molten slag contiguously above said top layer, said slag having a melting point lower than the temperature of said top layer and being electrically conductive when liquid, but substantially non-conductive when in the solid state, said zone of slag being melted by contact with said top layer; continuously moving a portion of said slag downwardly from said zone in a path away from said top layer; continuously cooling said moving slag, whereby the slag solidifies at a point along said path which is a predetermined distance from said top layer; sensing the electrical resistance of the body of metal in said gap and of the slag in said path at a point which is in fixed relation to said welding electrode; and moving said welding electrode upwardly in said gap whenever the sensed electrical resistance rises above a predetermined value.

References Cited in the file of this patent

UNITED STATES PATENTS

| | | |
|---|---|---|
| 2,340,093 | White | Jan. 25, 1944 |
| 2,364,645 | Mott et al. | Dec. 12, 1944 |